Patented Jan. 8, 1929.

1,698,048

UNITED STATES PATENT OFFICE.

HANS T. CLARKE AND CARL J. MALM, OF ROCHESTER, NEW YORK, ASSIGNORS TO EASTMAN KODAK COMPANY, OF ROCHESTER, NEW YORK, A CORPORATION OF NEW YORK.

PROCESS OF MAKING CELLULOSE ACETO ESTERS CONTAINING HIGHER ACYL GROUPS.

No Drawing.   Application filed January 18, 1928.   Serial No. 248,741.

This invention relates to processes of making cellulose aceto esters containing higher acyl groups. One object of the invention is to provide simple, rapid, and easily controlled processes for making such esters. Another object is to provide processes which can introduce into cellulose esters higher acyl groups that have hitherto been difficult or impossible to introduce. Other objects will hereinafter appear.

We have found that partially deacetylated cellulose acetates, such as commercially available acetone soluble hydrolyzed cellulose acetates for example, can be esterified with higher acyl groups by the use of organic acid anhydrides. The unesterified hydroxyls in such cellulose acetates can be esterified in this way with a surprisingly wide variety of acyl groups. Suitable anhydrides which impel the esterification, can be either those which themselves contain the higher acyl groups, or those which do not contain such groups but impel esterification when mixed with acids containing said higher groups.

We shall now give numerous examples of different ways in which our invention may be carried out, but it will be understood that the latter is not limited to the details thus given, except as indicated in the appended claims.

We preferably employ acetone-soluble cellulose acetates containing from 34.5% to 37.5% of acetyl. These are substantially undegraded as indicated by their ability to form flexible, transparent films from their solutions. They are hydrolyzed cellulose acetates, the original acetyl percentage having been above 43% but lowered when deacetylation took place during hydrolysis. Of course, deacetylated cellulose acetates having acetyl values outside of the range hereinabove given can be utilized, but those described are commercially valuable and satisfactory.

Five parts by weight of such a cellulose acetate are added to an esterifying mixture comprising 20 parts by weight of stearic anhydride and 40 parts by weight of chloroacetic acid. Any of the well known esterifying catalysts can be employed, but magnesium perchlorate, say .05 parts by weight is as convenient as any. The reaction mass thus obtained is kept at 60 to 65° C. for about four hours. The product can be isolated from the reaction mixture by pouring the latter with agitation into methyl alcohol, the precipitate being washed with such alcohol. The product contains about 30% of stearyl and is soluble in acetone. By spreading and evaporating such solution, it can be deposited in the form of transparent films of great flexibility.

In the above example, in place of stearic anhydride, there can be substituted an equimolecular amount of an anhydride of one or more of the following organic acids,—propionic, n-butyric, iso-butyric, n-valeric, iso-valeric, n-heptylic, lauric, myristic, palmitic, cyclohexanecarboxylic, crotonic, cinnamic, hydrocinnamic, undecylenic, o-methoxybenzoic, benzoic.

In another example of our invention, 5 parts by weight of hydrolyzed acetone-soluble cellulose acetate containing about 36.6% of acetyl are added to an esterifying mixture containing 15 parts by weight of stearic acid, 20 parts by weight of chloroacetic anhydride, 20 parts by weight of chloroacetic acid, and .05 parts by weight of magnesium perchlorate. The mixture is maintained at 60 to 65° for about four hours, the product being precipitated with agitation into warm methyl alcohol. After washing with the latter, the precipitate can be dissolved in acetone, from which solution it yields transparent, flexible films. The precipitate contains about 45.7% of stearyl.

In the last given example, there can be substituted in place of stearic acid an equimolecular proportion of one or more of the following acids,—propionic, n-butyric, iso-butyric, n-valeric, iso-valeric, n-caproic, n-heptylic, caprylic, pelargonic, capric, lauric, myristic, palmitic, crotonic, cyclohexanecarboxylic, benzoic, o-methoxy-benzoic, o-chloro-benzoic, acetyl salicylic, phenylacetic, hydrocinnamic, cinnamic. The chloroacetic anhydride is a typical and preferred example of an organic acid anhydride which impels esterification, but is free from cellulose-esterifying groups. During the esterification, it is converted into chloroacetic acid which is also free from cellulose-esterifying groups under the conditions hereinabove specified. Other organic acid anhydrides having the same general characteristic are the halogenated fatty acid anhydrides containing less than 10 carbon atoms,—such as di and trichlor acetic anhydrides, mono, di and tribrom acetic anhydrides, mono, di and trichlor, and brom propionic and butyric anhydrides. But halogenation is not the only form of substitution which will give an anhydride the requisite property. For example, methoxyacetic anhydride can be used in place of chloroacetic anhydride in the above example. But from the standpoint of results and expense, we prefer to use monochloro acetic anhydride.

In still another example of our invention, 5 parts by weight of acetone-soluble cellulose acetate containing 37.5% of acetyl are added to a mixture of 15 parts by weight of oleic acid, 20 parts of chloroacetic anhydride, 20 parts of chloroacetic acid, and .05 parts of magnesium perchlorate. The mixture is kept at 65° C. for about four hours. It is then precipitated with agitation into methyl alcohol, and the precipitate washed with the latter. The product is soluble in chloroform or acetone, and may be deposited from such solutions in the form of transparent, flexible films. The cellulose aceto-oleate thus produced contains an ethylenic double bond in the long oleic chain. This can be halogenated. For example, the washed precipitate is dissolved in 15 parts by weight of chloroform containing 2 parts by weight of bromine. After about an hour at room temperature, the mixture being occasionally agitated, the solution is precipitated into methyl alcohol and the precipitate washed with the latter. The product contains about 15.7% of bromine, is soluble in acetone, and from its solution in the latter yields flexible, transparent films, the inflammability of which is remarkably low. Other unsaturated acids of the acrylic series can be substituted, in equimolecular proportions, for oleic acid, such as crotonic, and undecylenic.

By carrying out the last given example with hydrolyzed acetone-soluble cellulose acetate containing 34.5% of acetyl, there is obtained a final cellulose aceto-dibromo stearate containing about 19% of bromine.

In another example, 5 parts by weight of partially deacetylated cellulose acetate containing 37.5% of acetyl are added to a mixture of 20 parts by weight of chloroacetic anhydride, and 40 parts by weight of chloroacetic acid. When all of the ingredients have entered into solution, there are then added to the mixture 20 parts by weight of 9—10—dibromo stearic acid and .05 parts of magnesium perchlorate trihydrate. This mixture is kept at 60 to 65° C. for about four hours. The precipitating and washing are carried out in methyl alcohol. The cellulose aceto-dibromo stearate thus obtained, contains 15.7% of bromine, is soluble in acetone, and can be made into flexible, transparent films of extremely low inflammability. The percentage of bromine in the product may be increased to 19.5% by starting with an acetyl cellulose containing 34.5% of acetyl.

If, in the immediately preceding example, 9—10—dichloro stearic acid be substituted for the dibromo stearic acid, there will be obtained corresponding cellulose aceto-dichloro stearates, containing from 7.3% to 9.6% of chlorine, depending upon the receptivity of the particular hydrolyzed cellulose acetate employed. Also, if tetrachloro stearic acid be substituted for dibromo stearic acid in said example, there will be obtained cellulose aceto-tetra chloro stearates containing from 20% to 23% of chlorine. These are soluble in acetone and yield flexible films.

It will be noted that in our process, strong mineral acid is not liberated. When acyl chlorides, instead of anhydrides, are used in cellulosic esterification, the liberated hydrochloric acid is destructive to apparatus and tends to rapidly degrade the cellulose ester. So far as we are aware, acyl chlorides have, therefore, not been used commercially for cellulosic esterification, and it is a fundamental advantage of our process that it depends upon anhydrides which do not produce objectionable or degrading by-products and can be handled in the plant in substantially the same way as acetic anhydride, with which the art is familiar in commercial practice.

Having thus described our invention, what we claim as new and desire to secure by Letters Patent is:

1. In the process of making cellulosic aceto esters containing higher acyl groups, treating partially deacetylated cellulose acetate with an esterifying mixture which includes an organic acid anhydride of higher molecular weight than acetic anhydride and impels esterification, there being in said mixture a source of said higher acyl groups.

2. In the process of making cellulosic aceto esters containing higher acyl groups, treating partially deacetylated cellulose acetate with an esterifying mixture which includes an organic acid anhydride which impels esterification but is free from cellulose esterifying groups and during the esterification is converted into a compound that is also free from cellulose esterifying groups, there being in said mixture an organic acid containing said higher groups.

3. In the process of making cellulosic aceto esters containing higher acyl groups, treating acetone-soluble hydrolyzed cellulose acetate with an esterifying bath which includes a halogen substituted fatty acid anhydride having less than 10 carbon atoms, there being in said bath an organic acid containing said higher groups.

4. In the process of making cellulosic aceto esters containing higher acyl groups, treating acetone-soluble hydrolyzed cellulose acetate with an esterifying bath which includes chloro-acetic anhydride and a monocarboxylic organic acid containing said higher groups, the latter having an ethylenic double bond therein.

5. In the process of making cellulose aceto oleate, treating partially deacetylated cellulose acetate with an esterifying bath which includes chloroacetic anhydride and oleic acid.

Signed at Rochester, New York this 10th day of January 1928.

HANS T. CLARKE.
CARL J. MALM.

CERTIFICATE OF CORRECTION.

Patent No. 1,698,048.  Granted January 8, 1929, to

HANS T. CLARKE ET AL.

It is hereby certified that error appears in the above numbered patent requiring correction as follows: In the heading to the printed specification, line 6, for serial "No. 248,741" read "No. 247,741"; and that the said Letters Patent should be read with this correction therein that the same may conform to the record of the case in the Patent Office.

Signed and sealed this 4th day of February, A. D. 1930.

M. J. Moore,
Acting Commissioner of Patents.

(Seal)

chloro-acetic anhydride and a monocarboxylic organic acid containing said higher groups, the latter having an ethylenic double bond therein.

5. In the process of making cellulose aceto oleate, treating partially deacetylated cellulose acetate with an esterifying bath which includes chloroacetic anhydride and oleic acid.

Signed at Rochester, New York this 10th day of January 1928.

HANS T. CLARKE.
CARL J. MALM.

CERTIFICATE OF CORRECTION.

Patent No. 1,698,048.   Granted January 8, 1929, to

HANS T. CLARKE ET AL.

It is hereby certified that error appears in the above numbered patent requiring correction as follows: In the heading to the printed specification, line 6, for serial "No. 248,741" read "No. 247,741"; and that the said Letters Patent should be read with this correction therein that the same may conform to the record of the case in the Patent Office.

Signed and sealed this 4th day of February, A. D. 1930.

M. J. Moore,
Acting Commissioner of Patents.

(Seal)